(12) United States Patent
Hasan

(10) Patent No.: US 6,199,872 B1
(45) Date of Patent: Mar. 13, 2001

(54) QUICK-RELEASE MECHANISM FOR SCREWDRIVER BITS AND THE LIKE

(75) Inventor: Maz A. Hasan, Kitchener (CA)

(73) Assignee: Maxtech Consumer Products, L.L.C., Roseville, MI (US)

( * ) Notice: Subject to any disclaimer, the term of this patent is extended or adjusted under 35 U.S.C. 154(b) by 0 days.

(21) Appl. No.: 09/373,629

(22) Filed: Aug. 13, 1999

(51) Int. Cl.[7] .................. B23B 31/107; B23B 31/22
(52) U.S. Cl. ........................ 279/30; 279/74; 279/75; 279/155; 279/905; 279/906; 81/438
(58) Field of Search .................... 279/22, 74, 75, 279/155, 905, 906, 29, 30; 81/438

(56) References Cited

U.S. PATENT DOCUMENTS

| | | | |
|---|---|---|---|
| 1,119,276 | * 12/1914 | Griffith et al. | 279/75 |
| 1,516,257 | * 11/1924 | White | 279/74 |
| 2,135,861 | * 11/1938 | Thompson | 279/75 |
| 3,788,658 | * 1/1974 | Benjamin et al. | 279/75 |
| 4,577,875 | * 3/1986 | Miyakawa | 279/75 |
| 4,692,073 | 9/1987 | Martindell . | |
| 4,850,758 | 7/1989 | Morgan . | |
| 4,900,202 | 2/1990 | Wienhold . | |
| 5,013,194 | 5/1991 | Wienhold . | |
| 5,062,749 | * 11/1991 | Sheets | 279/75 |
| 5,452,906 | * 9/1995 | Huff et al. | 279/62 |
| 5,476,273 | * 12/1995 | Shadeck et al. | 279/60 |

FOREIGN PATENT DOCUMENTS

| | | | |
|---|---|---|---|
| 3324756 | * 1/1985 | (DE) | 81/438 |

* cited by examiner

Primary Examiner—Steven C. Bishop
(74) Attorney, Agent, or Firm—R. Craig Armstrong (57) ABSTRACT

A holder for holding a tool, having an elongated housing, including a longitudinal hole having a cross-section corresponding to the cross-section of a mounting portion of the tool bit. The housing further has at least one radial hole running from an outside surface of the connector to the longitudinal hole. The radial hole contains a substantially spherical locking means movably arranged in the radial hole. The means cooperates with a circumferential groove in the tool bit to lock the tool bit in place when the tool bit is fully inserted into the holder. A sleeve is arranged to reciprocally slide over the first connector between two end positions. The sleeve is biased towards the tool by a first biasing means, and the sleeve has a step arranged on the inside of the sleeve, which step blocks the locking means when a tool is fully inserted into the longitudinal hole. A plunger is arranged to reciprocally slide inside the longitudinal hole, being pressed by a second biasing means towards the tool. An anchoring means holds the second biasing means securely fastened to the bottom of the longitudinal hole. The holder automatically locks the tool bit in the holder after insertion and automatically ejects the tool bit after the sleeve has been released.

13 Claims, 12 Drawing Sheets

FIG. 17

QUICK-RELEASE MECHANISM FOR SCREWDRIVER BITS AND THE LIKE

BACKGROUND OF THE INVENTION

1. Field of the Invention

This invention relates to a self-locking, quick-loading, spring assisted mechanism for connecting tools to a holder, especially for use in hand tools having bit holders and exchangeable bit tools.

2. Description of the Prior Art

A variety of quick-release mechanisms for connecting tools, such as tool bits, to a holder are known. For example, U.S. Pat. No. 5,013,194 and U.S. Pat. No. 4,900,202 disclose a chuck assembly for tool bits where a tool bit is held in the chuck by detent means cooperating with a circumferential groove on the shank of the bit. The detent means are released by pulling a sleeve axially back from the tool bit, whereby the tool bit may be pulled out of the chuck. In U.S. Pat. No. 4,692,073, a similar chuck assembly is disclosed, but in this construction, the sleeve is rotated about the chuck to release the detent means, so that the tool bit is released and may be pulled out of the chuck.

Both of these solutions require the user to hold the tool, manipulate the sleeve and, simultaneously, either press the tool bit into the mechanism to install it or pull the tool bit out of the chuck. This may lead to situations where the user would ideally require three hands, to perform all these operations in a secure manner.

SUMMARY OF THE INVENTION

It is an object of the invention to mitigate and/or obviate the above mentioned disadvantages to provide a self-locking, quick-loading, spring assisted mechanism for connecting tools to a holder which lends itself to one-handed operation, i.e. the tool may be inserted and released using one hand only. The other hand of the user may thus at all times be used to hold the hand tool in a secure manner. Also, a hand tool using this mechanism is provided.

In the invention, a holder for holding a tool, the holder comprises an elongated housing, including a longitudinal hole having a cross-section to accept a mounting portion of the tool bit and a tool mount arranged on the side of the housing which is opposite to the longitudinal hole.

The housing further includes at least one radial hole running from an outside surface of the housing to the longitudinal hole, the at least one radial hole having a large diameter portion at the outside surface of the housing and a small diameter portion at the longitudinal hole, a substantially spherical locking means movably arranged in the at least one radial hole, cooperating with a circumferential groove in the tool bit to lock the tool bit in place when the tool bit is fully inserted into the holder.

An outer sleeve is arranged to reciprocally slide over the housing between two end positions, where the outer sleeve has a first end facing the tool bit and a second end facing the hand tool. The outer sleeve is biased towards the first end by a first biasing means, and the sleeve has a step arranged on the first end, which step blocks the locking means when a tool is fully inserted into the longitudinal hole. An end stop is arranged at a tool mounting side of the longitudinal hole of the housing.

The holder further comprises a plunger, arranged to reciprocally slide inside the longitudinal hole, a second biasing means, and an anchoring means, fastened to a bottom of the longitudinal hole. One end of the second biasing means is fastened to the plunger at a biasing fastening end of the plunger and the other end of the second biasing means is secured to the anchoring means.

Further, the longitudinal hole of the housing preferably has three different cross-section parts: a first large cross-section, which accepts the cross-section of the mounting portion of the tool bit, a second medium cross-section, which corresponds to the diameter of the second biasing means, and a third small cross-section, which corresponds to the cross-section of an anchoring end of the anchoring means, the anchoring end of the anchoring means being non-removably fastened in the third cross-section of the longitudinal hole.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 11:
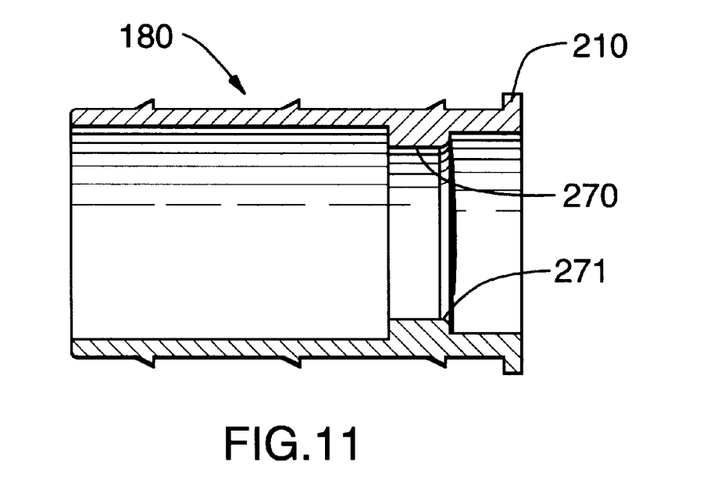
FIG. 11 is a sectional side view of one embodiment of a sleeve according to the invention.

Referring to FIGS. 1A to 4, a holder 100, for example mountable on a hand tool (not shown), for securely holding any one of a plurality of exchangeable tool bits 300, comprises an elongated housing 110 (see FIGS. 5A to 5D) and a substantially cylindrical sleeve 180 (see FIG. 11). The holder is attachable to the hand tool via a tool mount 10 arranged at one end of the housing 110.

Figure 17:
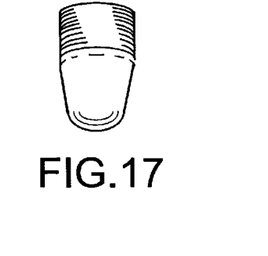
FIG. 17 is a perspective side view of an alternative embodiment of a locking means according to the invention.

The housing 110 has a central longitudinal hole 120, which has a cross-section corresponding to the cross-section of a mounting portion 310 of the tool bit. The mounting portion could be a ¼" hex or a 5⁄16" hex standard mount, for example. The longitudinal hole 120 is arranged at the end of the housing which is opposite to the tool mount 10, and is either formed as an integral part of the housing 110 or provided as a separate piece (not shown) that can be either screwed or pressed onto the housing. The mounting portion 310 of the tool bit may thus be inserted into the longitudinal hole of the housing by a user of the holder. The tool bit further has a profiled working portion 320 opposite the mounting portion. The housing includes at least one radial hole 130 which runs from an outside surface 140 of the housing to the longitudinal hole 120. The number of radial holes is between one and six, preferably two or three, or possibly more if a tool bit of non-hexagonal cross-section is to be held in the holder. The at least one radial hole 130 preferably has a large diameter bore portion 150 at the outside surface of the housing and a small diameter bore portion 160 at the longitudinal hole 120. The radial hole 130 further advantageously has a substantially truncated hemispherical shape, which cooperates with a locking means 170, preferably a substantially spherical ball, movably arranged in each one of the at least one radial holes. The locking means may, in principle, move from a position outside the longitudinal hole to a position where the locking means protrudes a distance into the longitudinal hole 120, but further movement is blocked because the diameter of the small diameter portion 160 of the radial hole is smaller than the diameter of the locking means. The locking means 170 cooperates with a circumferential groove 330 in the tool bit 300 to lock the tool bit in place when the tool bit is fully inserted into the holder 100. Alternatively, the locking means may be shaped as a truncated cone having a rounded tip (see FIG. 17), where the tip cooperates with the small diameter portion 160 of the radial hole. A still further alternative embodiment of the locking means/radial hole arrangement are locking means shaped as cylindrical rollers (not shown), which are placed in tangential slots (not shown) in the housing. The latter embodiment thus does not use radial holes but the tangential slots, where the slots have a smaller width in towards the longitudinal hole, compared to the width at the outer surface 140 of the housing. The small diameter portion 160 of the radial hole 130 may be formed by an inserted restriction (not shown), which is pressed into a radial hole of uniform cross-section (not shown).

Figure 12:
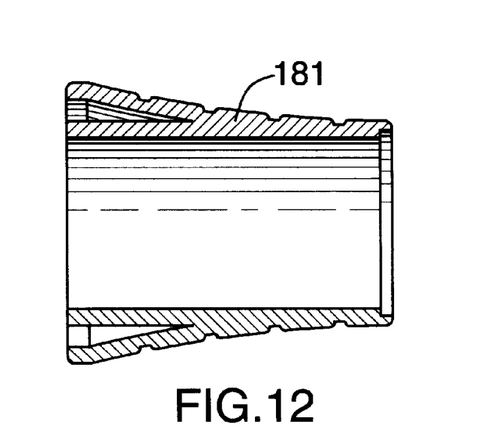
FIG. 12 is a sectional side view of one embodiment of a hand grip according to the invention.
Figure 14A:
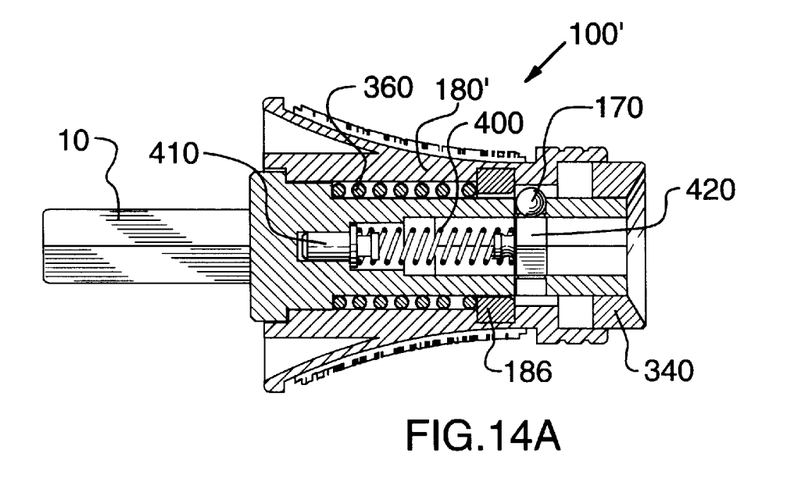
FIG. 14A is a sectional side view of a further embodiment of a holder according to the invention.
Figure 14B:
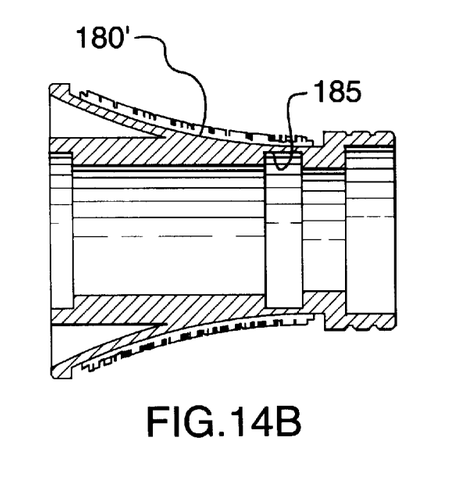
FIG. 14B is a sectional side view of the sleeve according to FIG. 14A.

The sleeve 180 is arranged to reciprocally slide over the housing 110 between two end positions. The outer sleeve has a first end 210 facing the tool bit 300 and a second end 220 facing the tool mount 10. A hand grip 181 (see FIG. 12) is advantageously arranged around the outer surface of the sleeve 180, for example in the shape of a collar, to provide an enhanced ergonomic gripping portion for generally handling the holder 100 and particularly pulling back of the sleeve. The hand grip is preferably made of a plastic material, or a combination of plastic material and TPR material (thermoplastic rubber). The sleeve/hand grip combination may alternatively be shaped as one integral piece, as shown in FIGS. 14A and 14B).

On the inside of the first end 210 of the sleeve, a step 270 is arranged. The step has a diameter which is larger than the outer diameter of the housing 110. The step 270 acts as a locking means depressor when a tool bit is inserted fully into the longitudinal hole, which will be described in detail later. The step preferably has a rounded edge 271 facing the tool bit 300, to facilitate the movement of the sleeve 180 over the locking means 170 when the locking means is in its locked position (as will be described later). Alternatively, the step may be formed by utilizing a separate ring 186, which is insert-moulded into a suitable recess inside the sleeve (see the description further below regarding FIGS. 14A to 14C).

Figure 8:
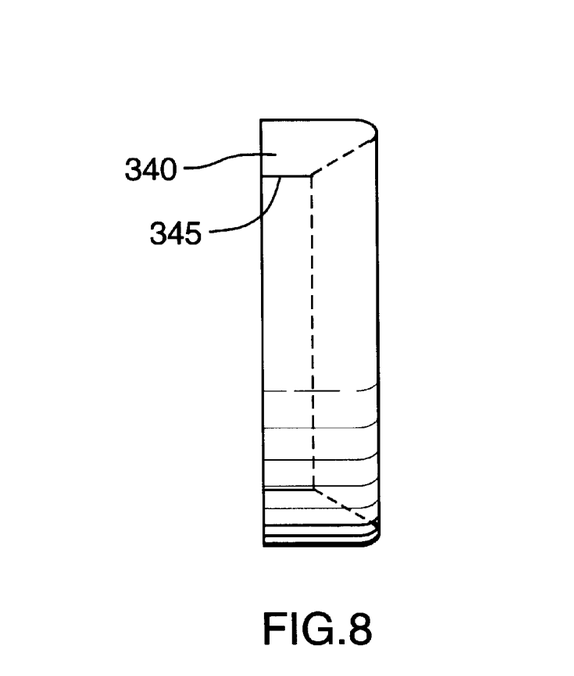
FIG. 8 is a side view of one embodiment of an end stop according to the invention.

An end stop 340 (see FIG. 8) is arranged at the longitudinal hole end of the housing 110. The end stop is preferably ring formed, having an access hole 345 with an inner diameter which is slightly larger than the outside diameter of the housing 110, thus enabling the end stop to be press fit onto the housing. The end stop is either a separate piece (as shown in Figures), which is either screwed or pressed on the housing, or shaped as an integral part of the housing 110. To facilitate the retention of the end stop 340 on the housing 110, the outside surface of the end of the housing facing the tool bit preferably has a friction enhancing surface pattern 111 (see FIG. 5B), such as splines. The end stop limits the movement of the sleeve at the longitudinal hole end of the housing. Furthermore, the end stop 340 is preferably tapered on the side facing away from the holder, the taper going from a thicker outer part to a thinner inner part of the end stop. In this way, the end of the tool bit is guided towards the longitudinal hole when a user is attempting to install the tool bit in the holder.

Figure 9:
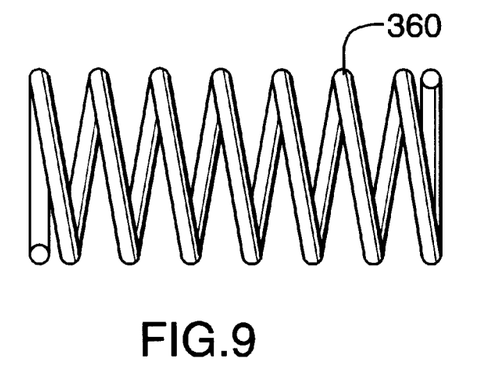
FIG. 9 is a side view of one embodiment of a first biasing means according to the invention.

A first biasing means 360 (see FIG. 9) is arranged between a first biasing means retaining step 250 arranged at the tool mount 10 end of the housing and the step 270, to bias the sleeve 180 in a direction away from the tool mount 10. A sleeve retainer means 260 is also arranged on the part of the housing 110 which faces the tool mount and is preferably shaped as a flange having a larger diameter than the first biasing means retaining step 250. The sleeve retainer means thus limits the movement of the sleeve at the tool mount 10 end of the housing.

Figure 1A:
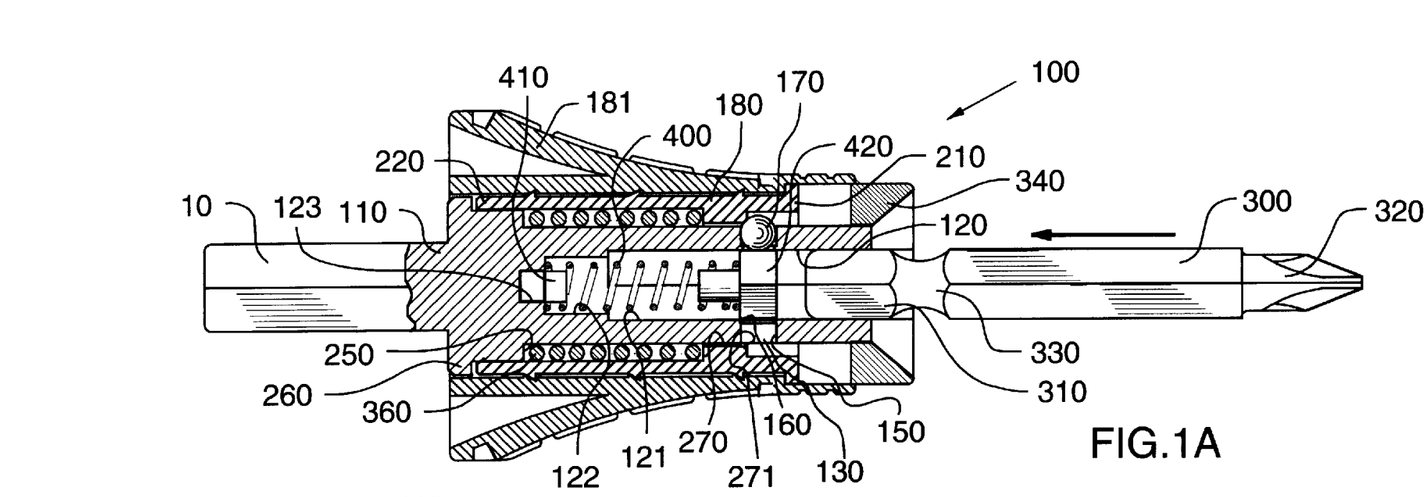
FIG. 1A is a sectional side view of one embodiment of a device according to the invention, showing the device in the position where the tool bit is just starting to be inserted into the holder.
Figure 6:
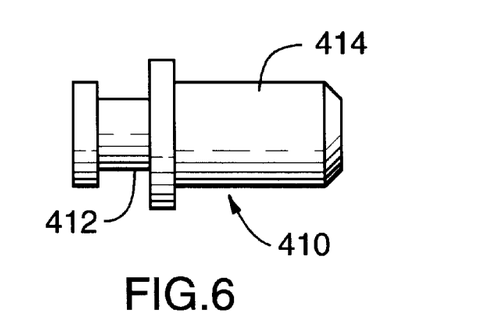
FIG. 6 is a side view of one embodiment of an anchoring means according to the invention.
Figure 7:
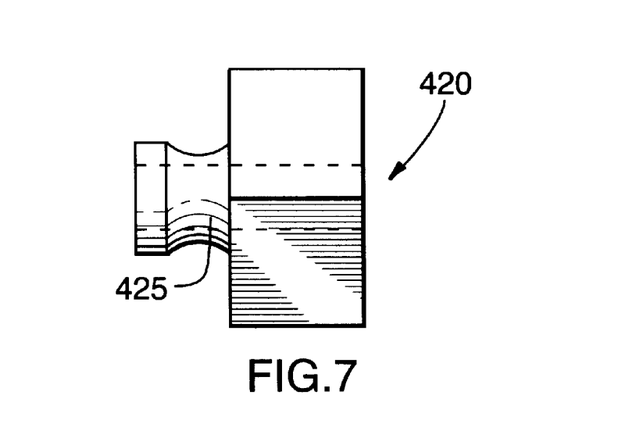
FIG. 7 is a side view of one embodiment of a plunger according to the invention.
Figure 10:
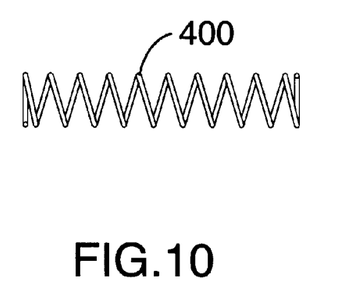
FIG. 10 is a side view of one embodiment of a second biasing means according to the invention.

The longitudinal hole 120 of the housing 110 has three different cross-section parts: a first large cross-section 121, which corresponds to the cross-section of the tool bit 300, a second medium cross-section 122, which corresponds to the diameter of a second biasing means 400 (see FIG. 10), and a third small cross-section 123, which corresponds to the cross-section of an anchoring end 414 of a first anchoring means 410 (see FIG. 6). A first plunger 420 (see FIG. 7) is arranged to reciprocally slide inside the first cross-section 121. One end of the second biasing means 400 is fastened to the first plunger 420 at a biasing fastening end 425 of the first plunger and the other end of the second biasing means is fastened to the first anchoring means 410 at a biasing means fastening end 412 of the anchoring means. The anchoring end 414 of the first anchoring means 410 is non-removably fastened in the third cross-section 123 of the longitudinal hole 120, so that the first anchoring means is securely held in the third cross-section part during normal operation of the holder 100. Thus, the second biasing means 400 presses the first plunger 420 towards a position in which the first plunger covers the radial holes so that the locking means are prevented from entering into the longitudinal hole 120. In this position, the sleeve 180 will be biased by the first biasing means 360 to a position in which the sleeve step 270 is pressing against the locking means 170, but the sleeve is prevented from further motion by the first plunger 420 which blocks the locking means from movement into the longitudinal hole 120. This is the position of the holder mechanism when no tool bit is inserted (fully) into the longitudinal hole, as shown in FIG. 1A. The first anchoring means 410 is either shaped as a separate piece (as shown in Figures) which is pressed into the housing 110 or shaped as an integral part of the housing 110. The first plunger 420 is either a solid piece, a circular ring or a hex-in-hex shape to fit inside the housing.

Figure 1B:
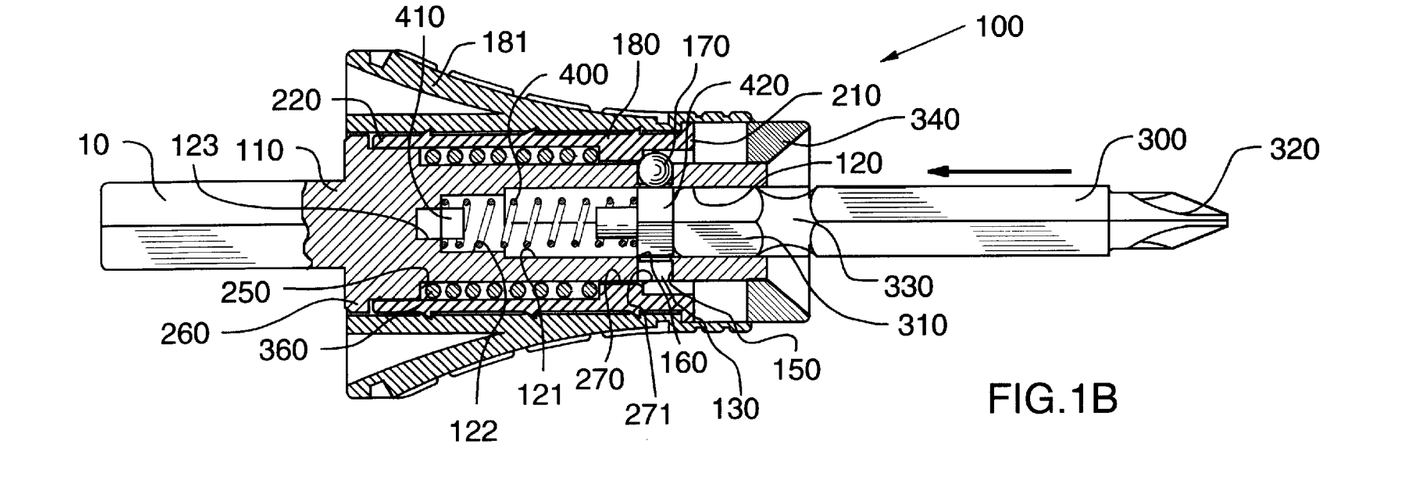
FIG. 1B is a sectional side view of one embodiment of a device according to the invention, showing the device in a position where the end of the tool bit has just reached the plunger.
Figure 1C:
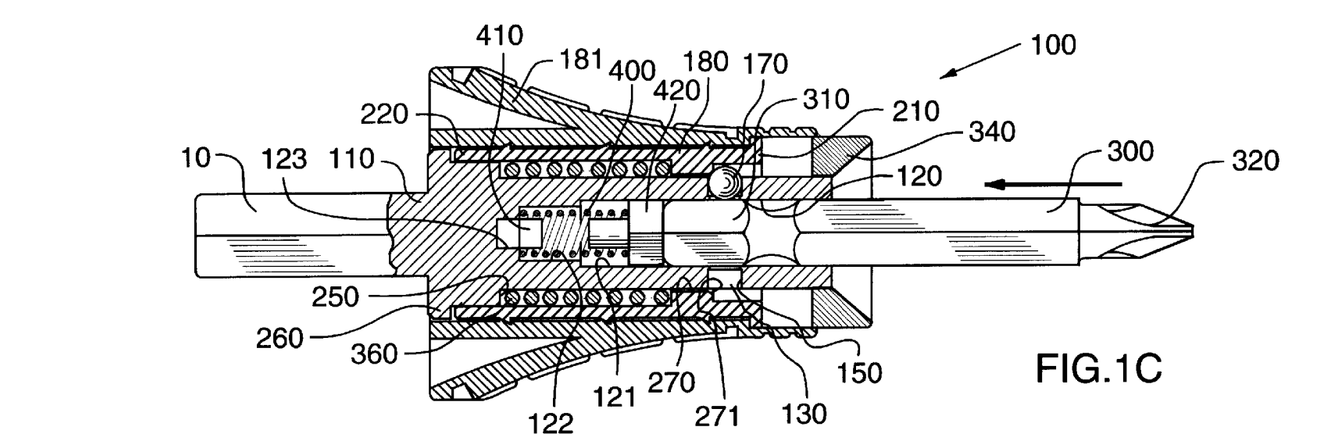
FIG. 1C is a sectional side view of one embodiment of a device according to the invention, showing the device in a position where the end of the tool bit has passed the locking means, and the second biasing means is being depressed by the tool bit.
Figure 1D:
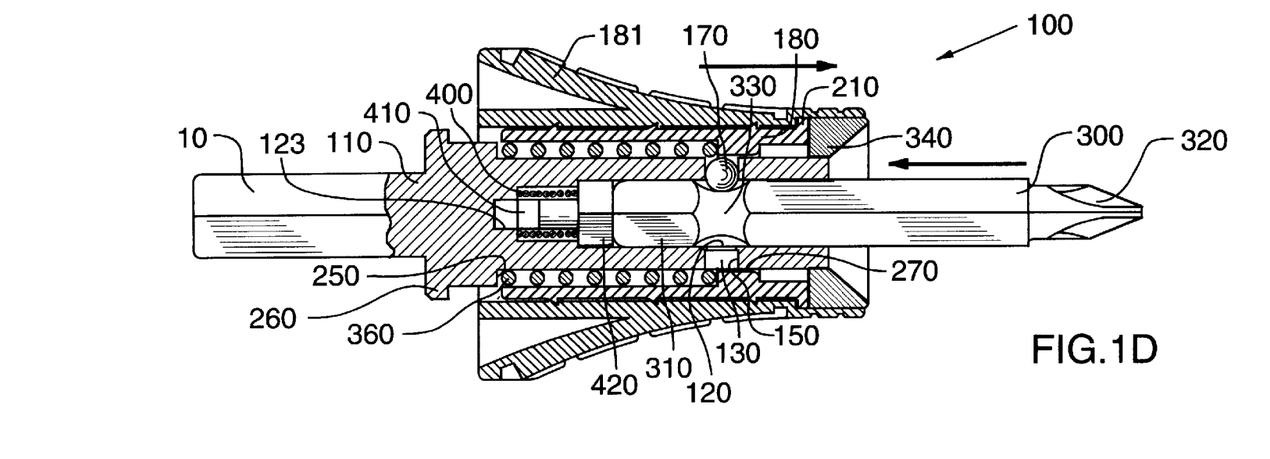
FIG. 1D is a sectional side view of one embodiment of a device according to the invention, showing the device in a position where the plunger has reached its depressed end position.

Referring to FIG. 1B, the tool bit 300 is inserted further until it makes contact with the first plunger 420. Further insertion of the tool bit will press the first plunger towards the tool mount 10, and thus compress the second biasing means 400. At the same time, the first plunger 420 will be moved away from the radial hole 130, thus making it possible for the locking means to move into the longitudinal hole 120 when the tool bit has been inserted enough for the circumferential groove 330 to line up with the radial hole. This sequence is shown in FIGS. 1C and 1D. In FIG. 1D, the tool bit 300 is fully inserted into the longitudinal hole 120, and the first plunger 420 has reached the bottom of the first large cross-section 121. The tool bit is thus prevented from being inserted further, and the locking means or locking means 170 enter into the circumferential groove 330 of the tool bit. The sleeve 180 is then pressed towards the tool bit by the first biasing means 360. The rounded edge 271 of the sleeve step 270 facilitates the gliding of the sleeve past the locking means. The sleeve is thus pressed up all the way until it is stopped by the end stop 340. The sleeve step 270 is, in this position, located above the radial hole 130 and the locking means 170, thus preventing the locking means from moving out of the circumferential groove 330 of the tool bit. The tool bit is held securely in the longitudinal hole 120 of the housing 110.

Figure 2A:
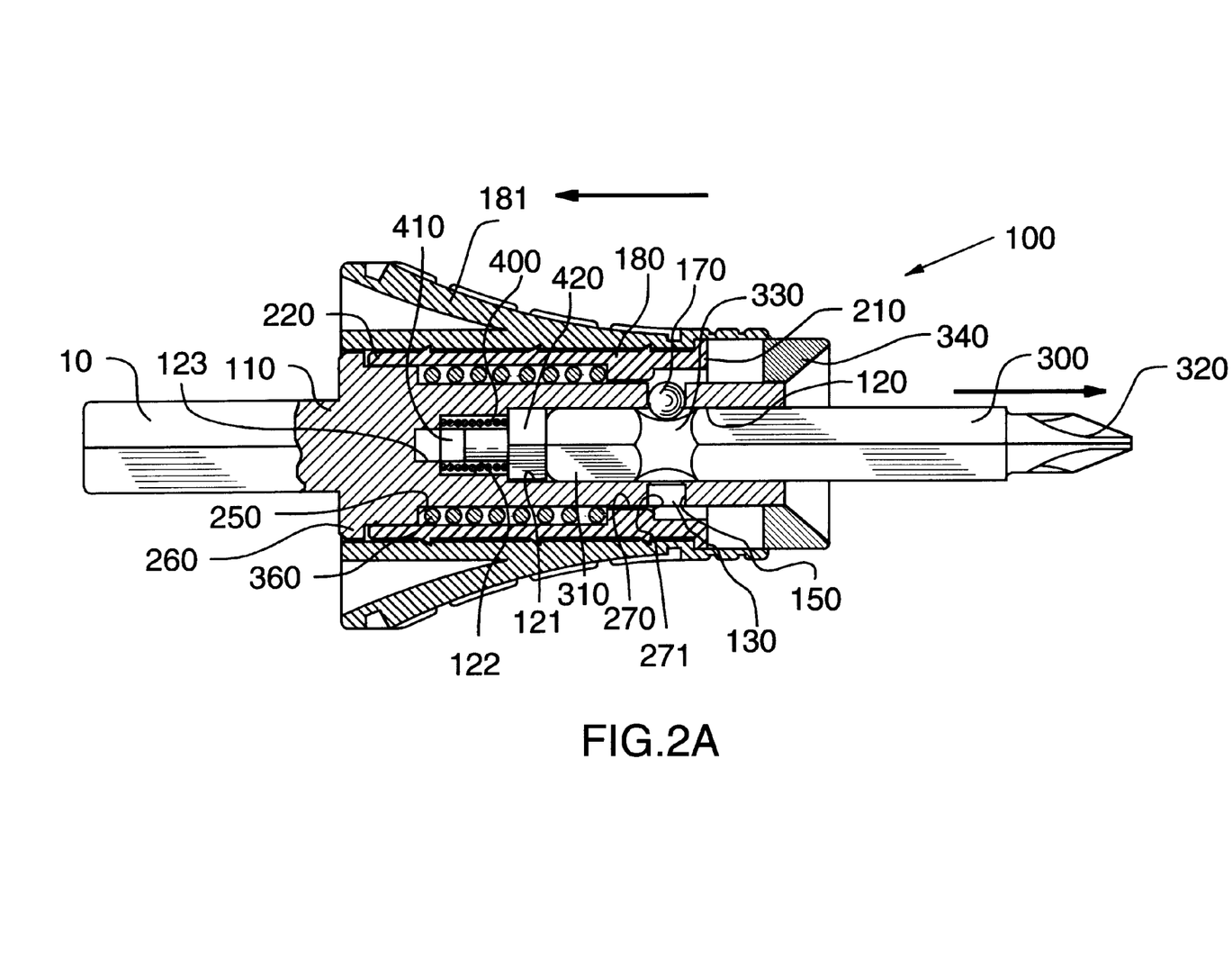
FIG. 2A is a sectional side view of one embodiment of a device according to the invention, showing the device in a position where the sleeve has been fully slid towards the tool mount.
Figure 2B:
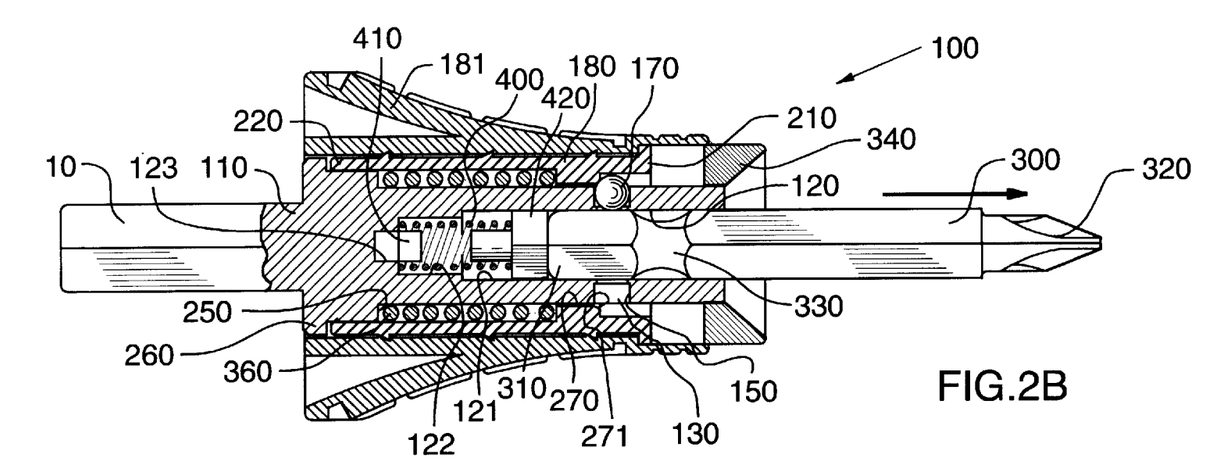
FIG. 2B is a sectional side view of one embodiment of a device according to the invention, showing the device in a position where the tool bit has been pushed out by the plunger so that the groove of the tool bit has passed the locking means.
Figure 2C:
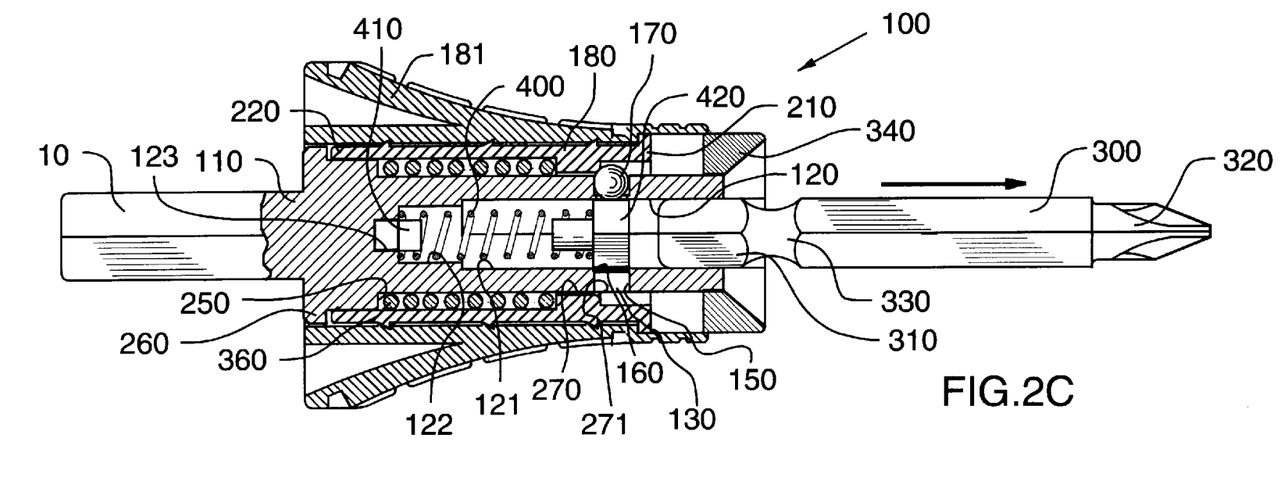
FIG. 2C is a sectional side view of one embodiment of a device according to the invention, showing the device in a position where the plunger has reached its fully extended end position.
Figure 3:
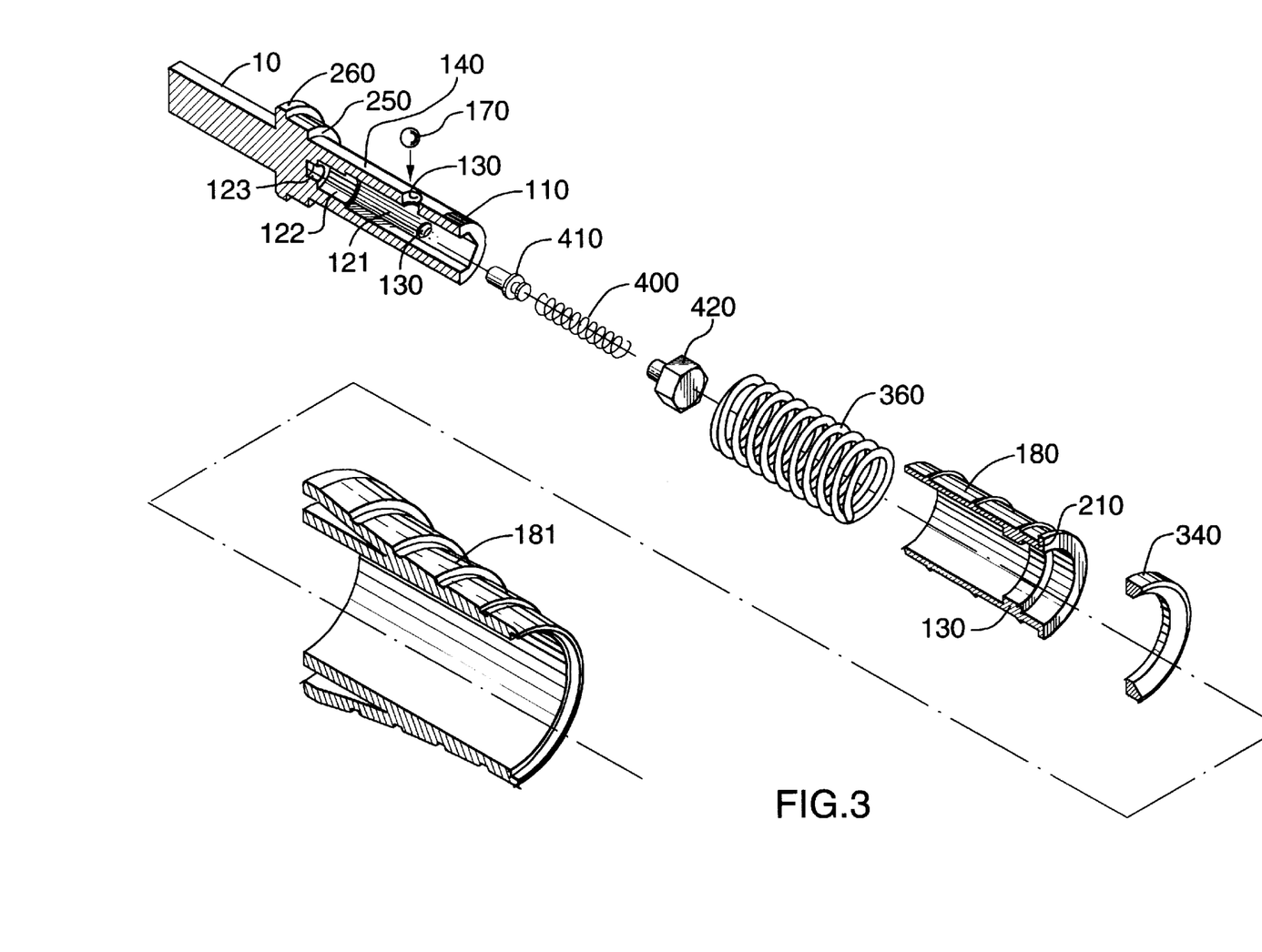
FIG. 3 is a partly sectioned elevational exploded side view of one embodiment of a device according to the invention.
Figure 4:
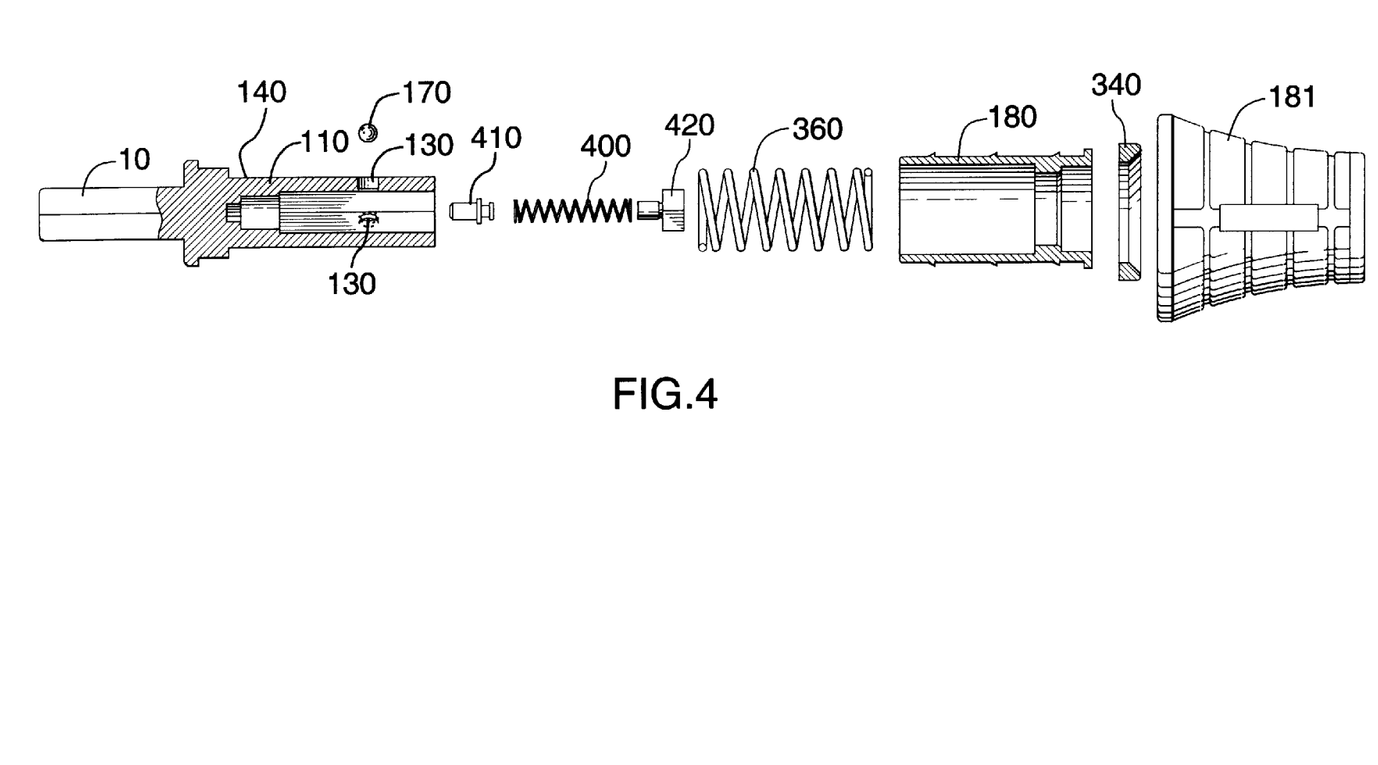
FIG. 4 is a partly sectioned exploded side view of one embodiment of a device according to the invention.
Figure 5A:
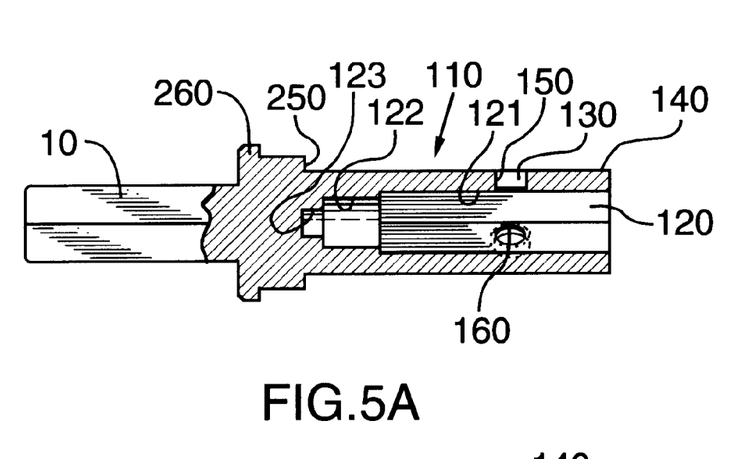
FIG. 5A is a sectional side view of one embodiment of a housing according to the invention.
Figure 5B:
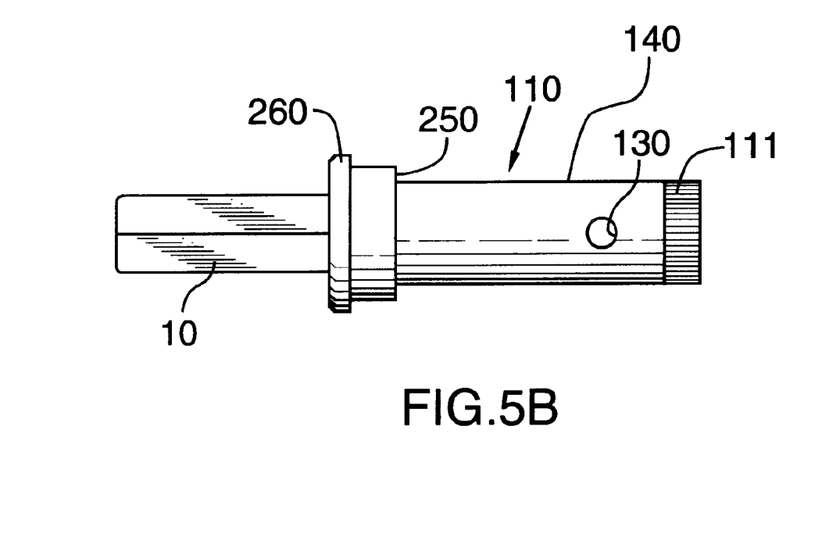
FIG. 5B is a side view of one embodiment of a housing according to the invention, seen from one of the radial holes.
Figure 5C:
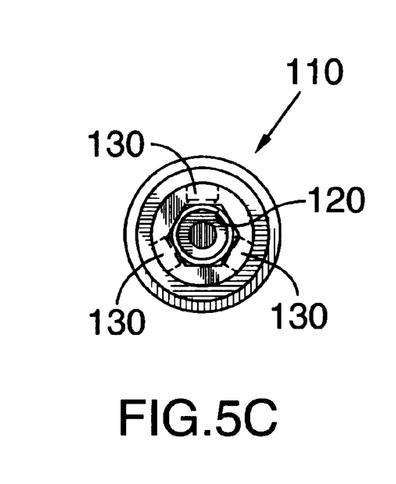
FIG. 5C is a frontal view of one embodiment of a housing according to the invention, as seen from the end of the longitudinal hole.
Figure 5D:
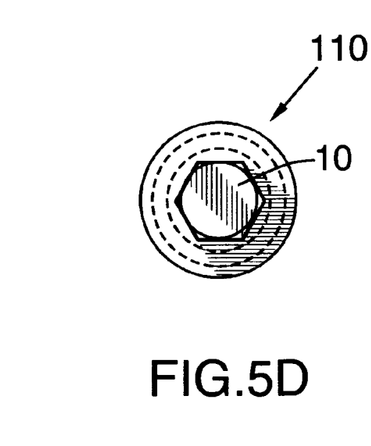
FIG. 5D is a frontal view of one embodiment of a housing according to the invention, as seen from the end of the tool mount.

To release the tool bit 300 from the longitudinal hole 120, the outer sleeve 180 will have to be fully pressed towards the tool mount 10 against the biasing force of the sleeve biasing means 360, as shown in FIGS. 2A and 2B. The sleeve step 270 is then moved away from the locking means 170, thus releasing the locking means to move in the radial hole 130. The tool bit 300 may be removed when the sleeve 180 is in this position. The second biasing means 400 will press the first plunger 420 towards the tool bit 300, thus ejecting the tool bit from the longitudinal hole 120 without any further intervention from the user, as shown in FIGS. 2B and 2C. The second biasing means 400 will be able to provide a complete ejection of the tool bit 300 if the tool bit is not too heavy. If a heavy tool bit, or another type of heavy tool, is used in the device, the second biasing means will provide a positive release of the tool bit or tool, facilitating the removal of the tool by the user. For example, the user will be able to easily shake the tool out of the holder and onto a table, or the like. When the second biasing means 400 is fully extended, the first plunger 420 will be located in front of the radial hole(s) 130, thus preventing the locking means 170 from entering the longitudinal hole 120. The locking means will prevent the sleeve from being pressed past the locking means by the first biasing means 360.

Figure 13:
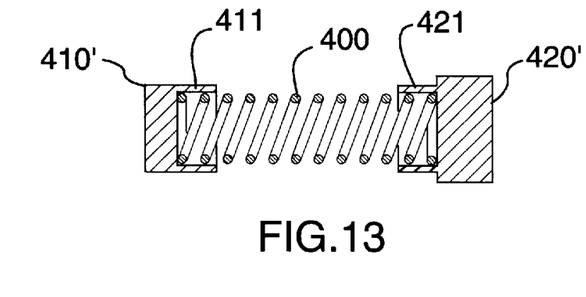
FIG. 13 is a sectional side view of a further embodiment of an anchoring means, plunger and second biasing means according to the invention.

An alternative embodiment of an anchoring means and a plunger is shown in FIG. 13. A second anchoring means 410' and a second plunger 420' are show, the second anchoring means having a first substantially cylindrical portion 411, into which one end of the second biasing means 400 is pressed and securely fastened. Similarly, the second plunger 420' has second substantially cylindrical portion 421, into which the other end of the second biasing means 400 is pressed and securely fastened. The second anchoring means 410' and the second plunger 420' cooperates with the rest of the holder in the same way as the first anchoring means 410 and the first plunger 420.

Figure 14C:
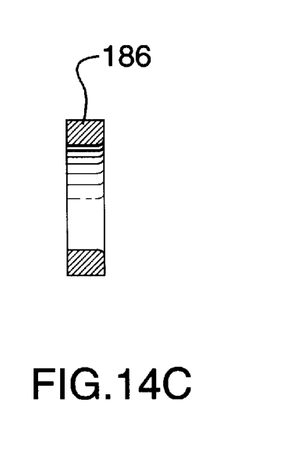
FIG. 14C is a sectional side view of the hand grip according to the invention.

In FIGS. 14A to 14C, an alternative embodiment of a holder 100' is shown. All technical features having the same shape and function as described earlier retain the same reference numerals. The sleeve and hand grip are preferably integrated into one piece 180'. The integrated piece preferably has an inner annular recess 185, adapted to receive a substantially flat ring 186, which when inserted into the inner annular recess 185 has the same function as the earlier described step 270 of the sleeve 180 (see FIGS. 1A to 4). The ring 186 is preferably insert moulded into the inner annular recess 185.

Figure 15A:
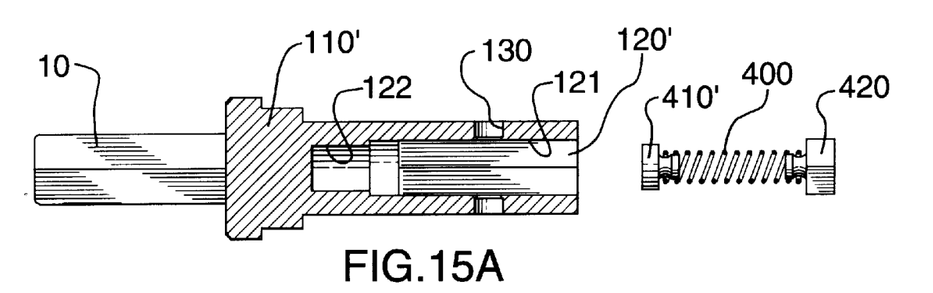
FIG. 15A is a sectional side view of an alternative embodiment of arranging the anchoring means according to the invention.
Figure 15B:
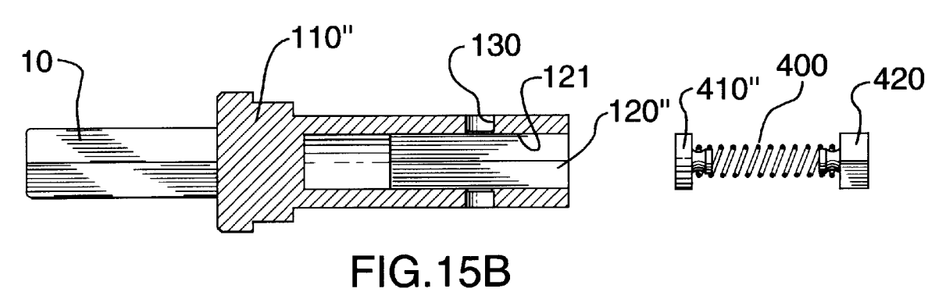
FIG. 15B is a sectional side view of a further alternative embodiment of arranging the anchoring means according to the invention.
Figure 15C:
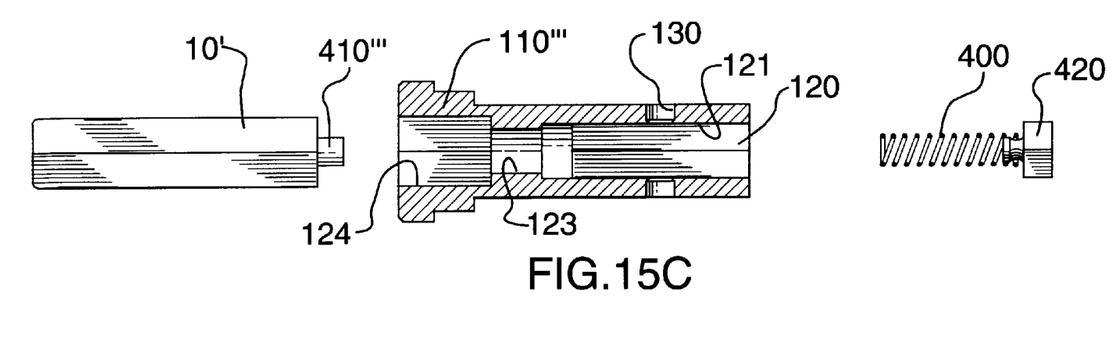
FIG. 15C is a sectional side view of yet an alternative embodiment of arranging the anchoring means according to the invention.

There are several different possibilities to arrange the anchoring means in the housing. FIG. 15A shows a further preferred embodiment of a housing 110' having a longitudinal hole 120'. The longitudinal hole is similar to the longitudinal hole described earlier, but has no third small cross-section. Instead, the plunger 410' has an outside diameter corresponding to the second medium cross-section 122, so that the plunger 410' may be inserted into the bottom of, and securely fastened in, the second medium cross-section 122. A further variation of how to fasten the plunger in the longitudinal hole is shown in FIG. 15B. The longitudinal hole 120" has a uniform cross-section all its length in the housing 110", corresponding to the first large cross-section 121. The plunger 410" has an outside diameter corresponding to the first large cross-section 121, so that the plunger 410" may be inserted into the bottom of, and securely fastened in, the first large cross-section 121. Yet a further embodiment of how to fasten the plunger in the longitudinal hole is shown in FIG. 15C. The tool mount 10' is shaped as a separate piece, having a second biasing means anchoring means 410'" arranged at one end. The housing 110'" has a tool mount mounting hole 124 arranged to securely hold the tool mount 10' after insertion. The tool mount 10' thus provides the necessary anchoring means 410'41 for the second biasing means 400.

Figure 16A:
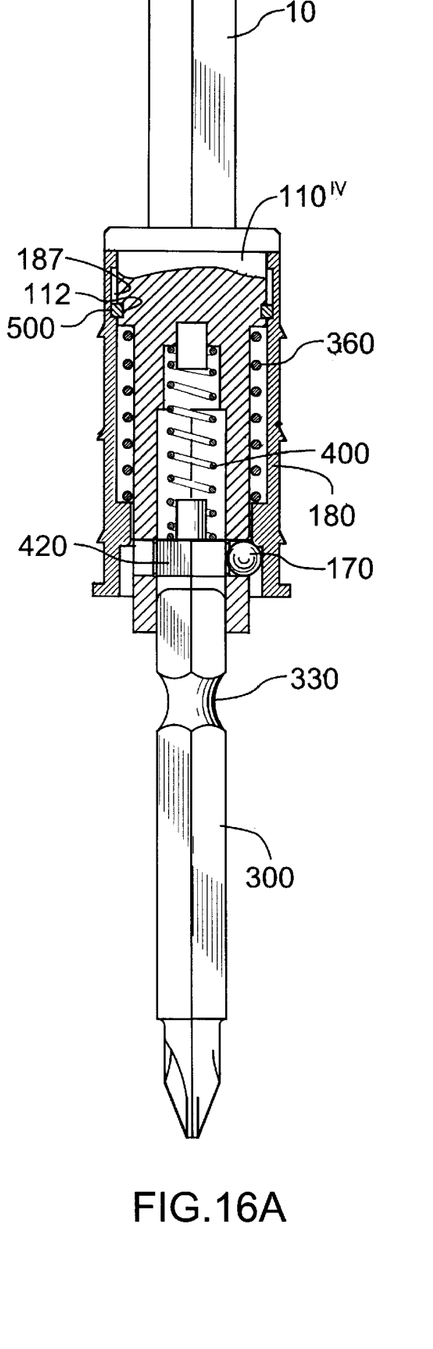
FIG. 16A is a sectional side view of an alternative embodiment of retaining the sleeve on the housing according to the invention, showing the tool bit and the device before mounting the tool bit.
Figure 16B:
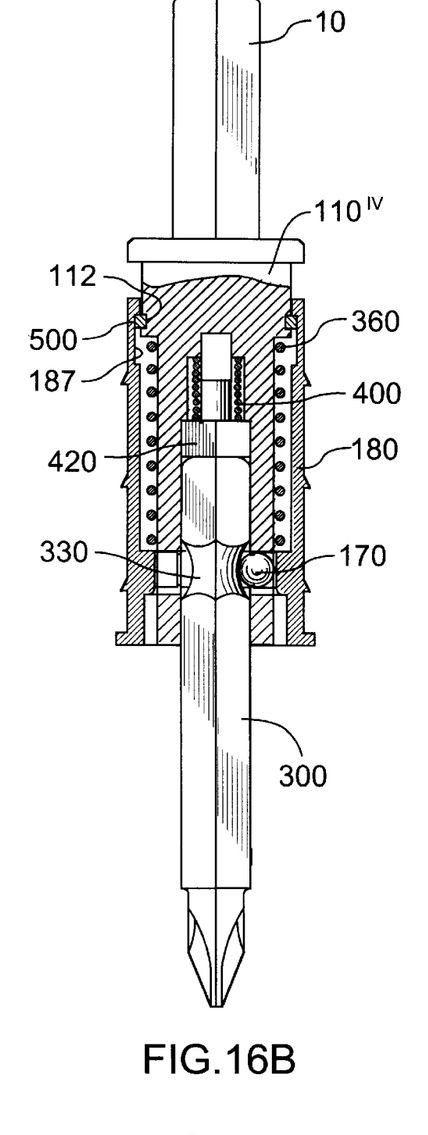
FIG. 16B is a sectional side view of the device according to FIG. 16A, showing the tool bit in its inserted and secured position in the device.

FIGS. 16A and 16B show an alternative means of retaining the sleeve 180 on the housing 110$^{IV}$. The housing of this embodiment has an outer retaining groove 112 arranged adjacent the tool mount 10. A retaining ring 500 is arranged to snap-in in the outer retaining groove. The sleeve 180 further has an inner retaining groove 187, which stretches for a certain length inside the sleeve, to define the distance the sleeve can reciprocate relative the housing, after the sleeve is mounted on the housing. All other technical features are the same as the first embodiment, and use the corresponding reference numerals.

The device according to any of the described embodiments of the invention adds safety to the use of the device, because the device automatically locks the tool bit in the holder after insertion and automatically ejects the tool bit after the sleeve has been released. No action, other than the insertion itself, has to be performed by the user to insert and lock the tool bit in place. As a safeguard, the device has to be actively manipulated in order to release the tool bit from the holder again, and the actual removal of the tool bit from the longitudinal hole is not performed by the user. Thus, the handling of the holder is greatly facilitated, and the safety is enhanced because the user is able to both hold the tool/holder and insert/remove tool bits easily with only one hand holding the tool and one hand manipulating the holder.

It will be appreciated that the above description relates to the preferred embodiments by way of example only. Many variations on the invention will be obvious to those knowledgeable in the field, and such obvious variations are within the scope of the invention as described and claimed, whether or not expressly described. For example, the tool has been illustrated as being a tool bit with a hexagonal seat portion. Any shape of the tool fastening portion is possible for use with the invention, such as round, square, rectangular or triangular, as long as the central longitudinal hole and location of the locking balls are adapted to this cross-section. Apart from being used to hold traditional tools, the invention also lends itself to other item holding devices, one example being a grip portion of a fishing rod, having a reel mount and sufficient gripping surfaces for a user to securely hold the device. To provide exchangeable rod portions, the different size rods (different diameters used to provide the wanted stiffness and feel for fishing different size fish) would have an end cross-section adapted to be held in the gripping device having a holding mechanism as described earlier in conjunction with the tool holder.

What is claimed as the invention is:

1. A holder for holding a tool or tool bit, the holder comprising:

an elongated housing, including a longitudinal hole at a distal end thereof having a cross-section sized to accept a mounting portion of the tool or tool bit, and a tool mount at a proximal end thereof, said housing further including at least one radial hole running from an outside surface of the housing to the longitudinal hole, the at least one radial hole having a large diameter portion at the outside surface of the housing and a small diameter portion at the longitudinal hole, a locking means having a nominal diameter less that said large diameter portion and greater than said small diameter portion, movably arranged in the at least one radial hole, movable between a outward location and an inward location, cooperating with a circumferential groove in the tool bit to lock the tool bit in place when the tool bit is fully inserted into the holder and when said locking means is at said inward location, an outer sleeve arranged to reciprocally slide over the housing between two end positions, where the outer sleeve has a distal end and a proximal end, and the outer sleeve is biased towards the distal end by a first biasing means, and where the sleeve has a portion thereof which blocks said locking means when a tool or tool bit is fully inserted into the longitudinal hole so as to prevent said locking means from moving away from said inward location where said tool or tool bit is locked in place, an end stop arranged to limit the movement of the sleeve in the biasing direction, wherein the holder further comprises:

a plunger, anchored within said longitudinal hole and arranged to reciprocally slide inside the longitudinal hole, biased to act against a proximal end of an installed tool bit to eject said tool bit when not locked in place.

2. A holder according to claim 1, wherein the longitudinal hole of the housing has three different cross-section parts:

a first large cross-section, which accepts the cross-section of the mounting portion of the tool bit, a second medium cross-section, which corresponds to the diameter of the second biasing means, and a third small cross-section, which corresponds to the cross-section of an anchoring end of the anchoring means, the anchoring end of the anchoring means being non-removably fastened in the third cross-section of the longitudinal hole.

3. A holder according to claim 1, wherein the longitudinal hole of the housing has two different cross-section parts:

a first large cross-section, which accepts the cross-section of the mounting portion of the tool bit, and a second medium cross-section, which corresponds to the diameter of the second biasing means, and also corresponds to the cross-section of an anchoring end of the anchoring means, the anchoring end of the anchoring means being non-removably fastened in the second cross-section of the longitudinal hole.

4. A holder according to claim 1, wherein the longitudinal hole of the housing has two different cross-section parts:

a first large cross-section, which accepts the cross-section of the mounting portion of the tool bit, and a second medium cross-section, which corresponds to the diameter of the second biasing means, and wherein the tool mount is shaped as a separate piece, having a second biasing means anchoring means arranged at one end, and the housing has a tool mount mounting hole arranged to securely hold the tool mount after insertion, so that the tool mount thus provides the necessary anchoring means for the second biasing means.

5. A holder according to claim 1, wherein the outer sleeve has a hand grip arranged on the outer surface of the sleeve.

6. A holder according to claim 5, wherein the hand grip is made of a plastic material.

7. A holder according to claim 5, wherein the hand grip is made of a combination of plastic material and thermoplastic rubber.

8. A holder according to claim 5, wherein the hand grip is shaped as a collar separate from the sleeve, fastened onto the sleeve.

9. A holder according to claim 5, wherein the hand grip is shaped as an integrated part of the sleeve.

10. A holder according to claim 1, wherein the longitudinal hole has a hex cross-section, corresponding to standard hex tool bit mounts.

11. A holder according to claim 1, wherein the locking means has a substantially spherical ball shape.

12. A holder according to claim 1, wherein the locking means has a substantially truncated cone shape, with a rounded tip.

13. A holder according to claim 1, wherein the small diameter portion of the radial hole for the locking means is formed by a restriction which is inserted into the radial hole.

* * * * *